(12) United States Patent
McCarney

(10) Patent No.: US 6,205,914 B1
(45) Date of Patent: Mar. 27, 2001

(54) TORTILLA FORMING MACHINE

(75) Inventor: Kevin T. McCarney, Burbank, CA (US)

(73) Assignee: Poquito Mas, Inc., North Hollywood, CA (US)

( * ) Notice: Subject to any disclaimer, the term of this patent is extended or adjusted under 35 U.S.C. 154(b) by 0 days.

(21) Appl. No.: 09/635,459

(22) Filed: Aug. 11, 2000

(51) Int. Cl.[7] .............................. A23L 1/00; A21C 11/00; A21B 1/42; B29C 43/02
(52) U.S. Cl. ............................. 99/349; 99/353; 99/373; 99/376; 99/423; 99/432; 425/385; 425/394
(58) Field of Search .......................... 99/349, 352–355, 99/372–380, 422, 423, 426, 427, 432, 450; 249/78, 104; 425/383, 385, 394, 398, 403, 404, 408, 412, 396, 403.1, DIG. 37, 150, 167; 426/512, 502; 219/524, 525

(56) References Cited

U.S. PATENT DOCUMENTS

| | | |
|---|---|---|
| D. 255,412 | 6/1980 | Bereza . |
| D. 369,941 | 5/1996 | Ramina . |
| D. 377,138 | 1/1997 | Angelo . |
| 1,880,858 * | 10/1932 | Davis ................................ 425/343 X |
| 2,975,741 | 3/1961 | Ruffino . |
| 3,716,319 * | 2/1973 | Norman ............................ 425/394 X |
| 3,814,005 | 6/1974 | Widdel . |
| 3,949,660 | 4/1976 | Kuhlman . |
| 4,303,677 * | 12/1981 | De Acetis ........................... 99/349 X |
| 4,559,002 * | 12/1985 | Atwood ............................. 425/394 X |
| 4,690,043 * | 9/1987 | Pacilio ................................... 99/353 |
| 4,857,349 | 8/1989 | Finlay . |
| 4,973,240 * | 11/1990 | Reilly ............................... 425/412 X |
| 5,074,778 | 12/1991 | Betts, Jr. et al. . |
| 5,149,594 * | 9/1992 | Lewandowski et al. ........ 426/496 X |
| 5,154,115 * | 10/1992 | Kian ................................... 99/432 X |
| 5,226,352 * | 7/1993 | Savage .................................. 99/349 |
| 5,417,149 | 5/1995 | Raio et al. . |
| 5,800,844 | 9/1998 | Raio et al. . |
| 5,996,476 | 12/1999 | Schultz . |

* cited by examiner

Primary Examiner—Timothy F Simone
(74) Attorney, Agent, or Firm—Vickers, Daniels & Young

(57) ABSTRACT

A tortilla forming machine for molding dough into a tortilla shell having a top, a bottom, a peripheral edge, and a thickness. The forming machine includes a first member having a first forming surface, a second member having a second forming surface moveable toward and away from the first forming surface, and at least one removable sizing ring. The sizing ring includes a first edge and an opposing second edge, an inner surface and a height defining a cavity between the first and second forming surfaces when the first forming surface is adjacent the first edge and the second forming surface is adjacent the second edge such that the inner surface of the ring forms the peripheral edge of the tortilla shell and the height of the ring forms the thickness of the tortilla shell.

22 Claims, 4 Drawing Sheets

TORTILLA FORMING MACHINE

FIELD OF THE INVENTION

The present invention relates to the art of making tortilla shells and, more particularly, to a tortilla forming machine for making a tortilla shell from a ball of dough.

BACKGROUND OF THE INVENTION

It is, of course, well known that a ball of dough can be molded into various shapes and sizes to produce food products. Traditionally, once the desired dough was properly mixed, the dough was rolled to the proper thickness and then cut into the shape needed to produce the food product. However, this method is labor-intensive and costly with respect to retail food products and restaurant services.

Over the years, machines have been utilized to overcome this problem by mechanically forming dough into the desired thickness and shape. In this respect, U.S. Pat. No. 5,996,476 discloses a device for pressing and imprinting bread products. The disclosed device utilizes a mold cavity which is permanently attached to the upper support frame of the device, wherein the upper mold portion is pivotally interengaged with the base mold portion for forming the dough thereagainst. Accordingly, the device disclosed in the '476 patent is utilized for the production of high volumes of bread products in one size. U.S. Pat. No. 3,814,005 discloses a pizza crust forming device. As with the '476 patent, the '005 patent discloses a dough forming device with pivotal engagement; however, the mold cavity of the '005 device is produced by a recess in the lower mold portion. Further, the mold cavity is attached to the lower mold portion which inhibits the ability to change the thickness or peripheral geometry of the finished dough product.

U.S. Pat. No. 5,800,844 discloses a dough pressing machine which utilizes linear motion between the upper and lower forming surfaces. The quantity of dough can be pressed from a dough ball into a desired thickness by controlling the stroke of the upper forming surface; however, the dough formed between the upper and lower planer surfaces will not have a controlled peripheral shape. U.S. Pat. Nos. 3,949,660 and 5,074,778 also disclose dough forming machines that utilize linear motion to mold a dough ball into a desired thickness. However, the '660 and '778 patents disclose a mold cavity attached to the upper portion of the mold to control both the thickness and the peripheral shape of the finished dough product.

U.S. Pat. No. 5,417,149 discloses a dough press for making pizza crust which also utilizes linear motion of an upper forming portion with respect to the stationary base portion. However, the '149 patent discloses a device which can be utilized to produce a dough product of more than one thickness and peripheral shape. In this respect, the mold cavity of the '149 patent is produced by the upper surface of a pizza pan and the recessed lower surface of an upper mold when the upper mold is directly adjacent the pizza pan. The mold cavity includes a disk shaped portion for the body of the pizza crust and a larger peripheral gap for the raised edge portion of the pizza crust. Accordingly, two independent components must be in proper alignment to form the dough into a pizza crust. This is accomplished by guide pins on the upper surface of the base portion which engage the outer peripheral edge of the pizza pan thereby aligning the pizza pan with the upper mold. As a result, a change in crust size requires a different pizza pan and adjustment of three guide pins so the pizza pan remains coaxial with the upper mold portion. Further, the upper mold portion must be replaced to correspond with the new pizza pan size.

As will be appreciated from the above, dough forming machines exist in the prior art; however, they are not well adapted to producing dough products of differing thickness and peripheral shape without considerable modification. Further, some machines are designed to be used to produce only one configuration of dough product. In addition, each of the devices in the prior art include a mold cavity on one of its forming surfaces which requires the molded dough to be scooped therefrom after the forming process.

SUMMARY OF THE INVENTION

In accordance with the present invention, a tortilla forming machine is provided which advantageously allows dough products to be produced having a uniform thickness and peripheral shape. Further, the tortilla forming machine allows changes in the thickness and peripheral shape to be accommodated quickly without requiring extensive modifications to the forming machine. Moreover, the forming machine allows for easy removal of the formed dough from the mold cavity after the forming process.

In this respect, a tortilla forming machine is provided to produce the foregoing advantages by utilizing thin rings to produce the mold cavity. Further, the ring which produces the desired mold cavity can quickly and easily be replaced with a ring of a different size to allow the dough to be made into a dough product of different thicknesses and peripheral shapes. Moreover, the sizing ring is separate from the upper and lower forming surfaces and, therefore, can be separated from the forming machine to facilitate the removal of the dough product.

It is accordingly an outstanding object of the present invention to provide an improved tortilla forming machine for molding tortilla shells of a desired thickness and peripheral shape.

A further object of the present invention is to provide a tortilla forming machine which can quickly form a dough ball into the desired tortilla shell.

Yet another object of the present invention is to provide a tortilla forming machine that allows the tortilla shell to be easily removed from the mold cavity.

Yet still another object of the present invention is to provide a tortilla forming machine that can be quickly and easily modified to produce tortilla shells of a different size.

Still yet another object of the present invention is to provide a tortilla forming machine that can produce a number of differently sized tortilla shells.

Yet a further object of the present invention is the provision of a tortilla forming machine of the foregoing character which is economical to manufacture, easy to manipulate with respect to forming the dough ball, and which is effective in repeatedly producing a tortilla shell of the desired thickness and peripheral shape.

BRIEF DESCRIPTION OF THE DRAWINGS

The foregoing objects and others will in part be obvious and in part be pointed out more fully hereinafter in conjunction with the written description of the preferred embodiments of the invention illustrated in the accompanying drawings in which.

DESCRIPTION OF THE PREFERRED EMBODIMENTS

Figure 1:
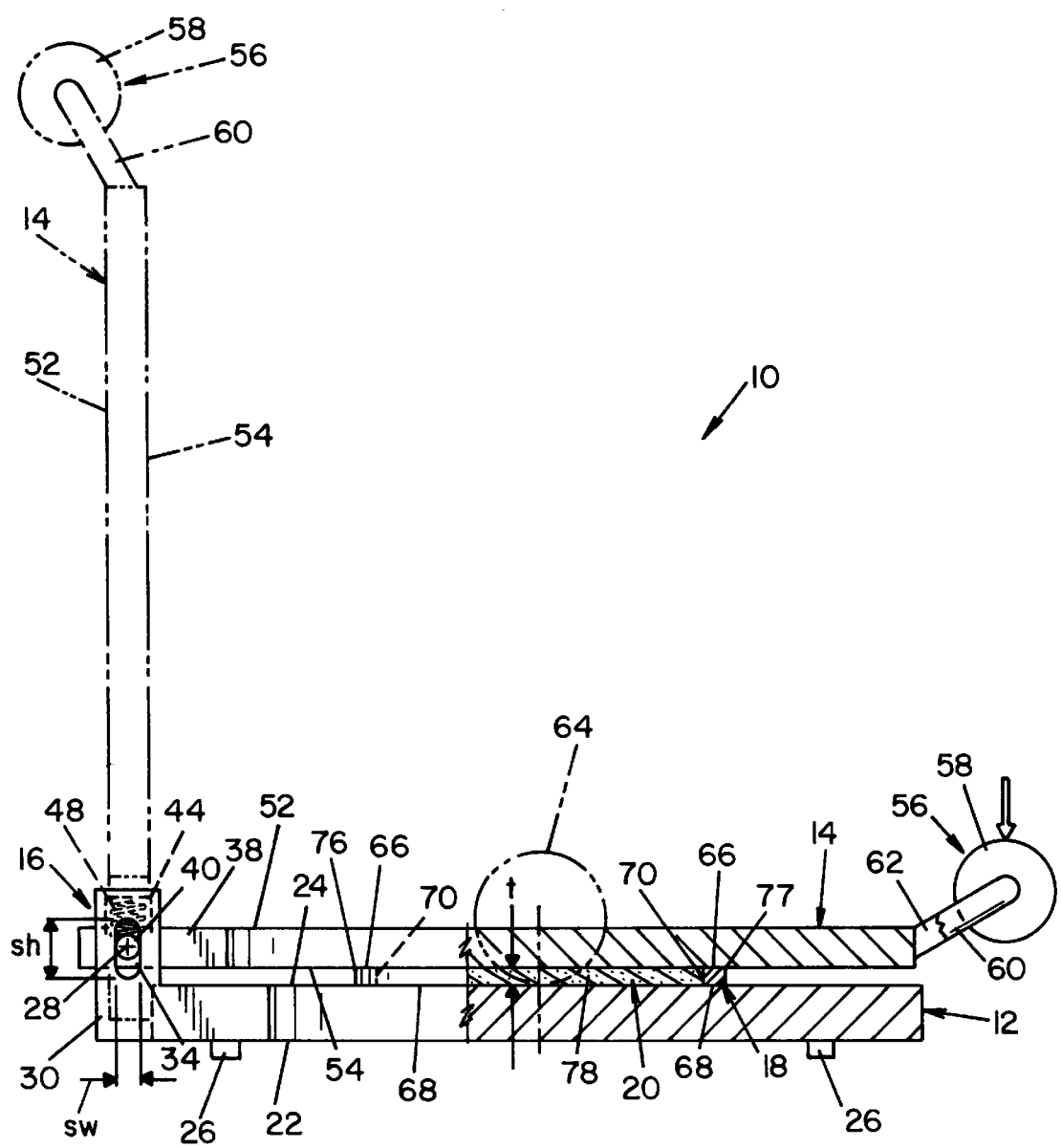
FIG. 1 is a partial section of a side elevational view of a tortilla forming machine in accordance with the present invention.
Figure 2:
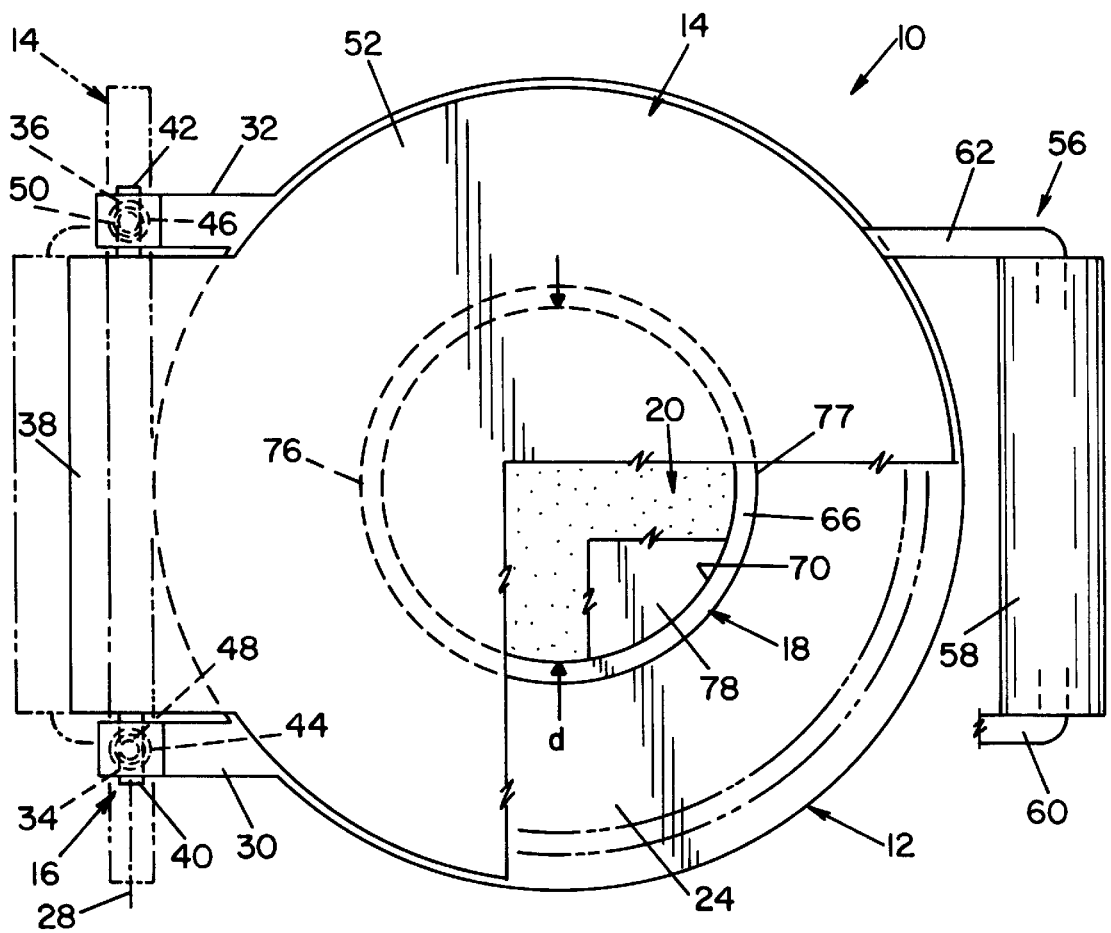
FIG. 2 is a partial section top plan view of the tortilla forming machine illustrated in FIG. 1.
Figure 3:
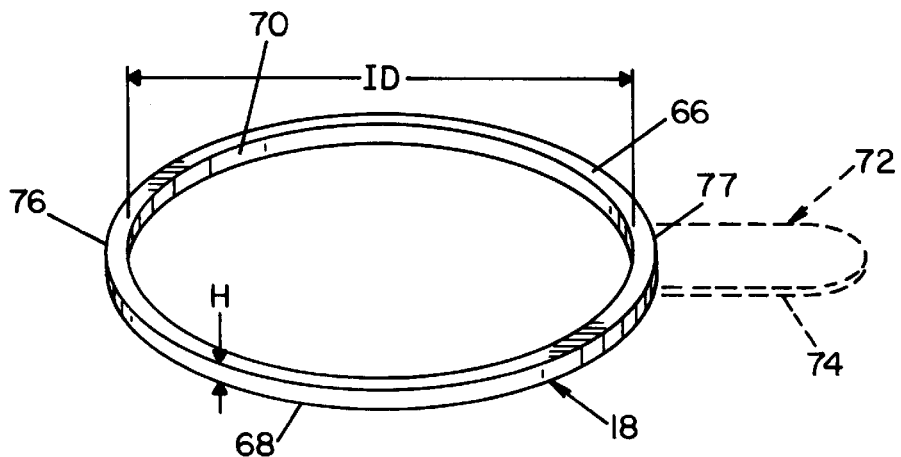
FIG. 3 is a perspective view of a sizing ring used in connection with the tortilla forming machine illustrated in FIG. 1.
Figure 4:
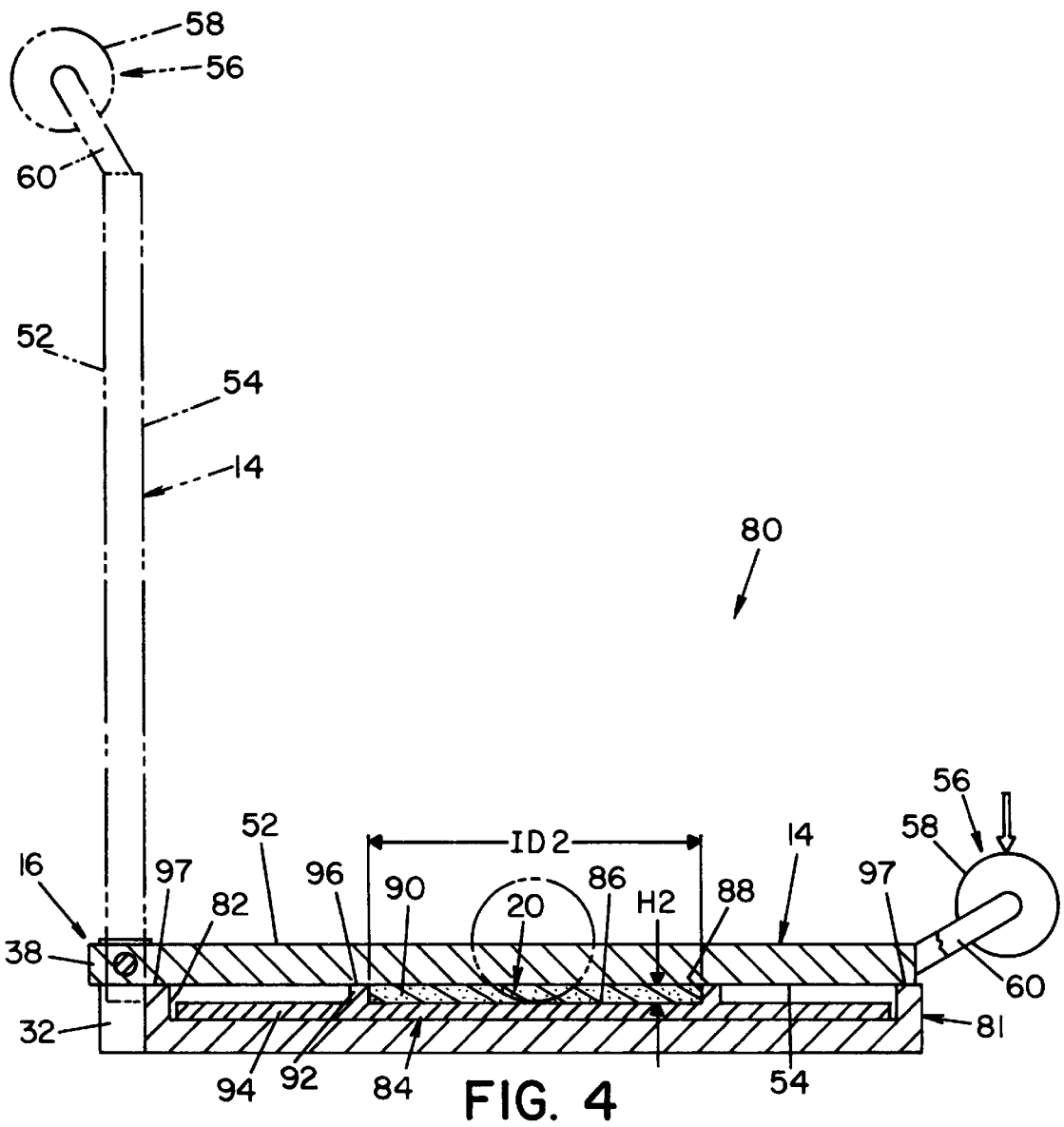
FIG. 4 is a sectional elevation view showing another embodiment of the tortilla forming machine shown in FIG. 1.

Referring now to the drawings wherein the showings are for the purpose of illustrating preferred embodiments of the invention only and not for the purpose of limiting the same, FIGS. 1–3 show a first embodiment of a tortilla forming machine 10 which includes a base 12 and a lid 14 pivotally connected to base 12 by a hinge 16. The tortilla forming machine further includes at least one sizing ring 18 which determines the thickness t and peripheral shape, which is preferably a diameter d, of a tortilla shell 20.

Base 12 includes a bottom surface 22 and a top forming surface 24. While base 12 can be made from various materials such as, but not limited to, metal, plastic or wood, it is preferred that top forming surface 24 is made from materials designed for use with food products. This can include stainless steel and hard woods. Further, in order to facilitate the removal of the tortilla shell after the forming process, forming surface 24 can be made from a non-stick material such as TEFLON®, produced by E. I. DuPont DeNemours and Company. While the bottom surface 22 of base 12 can be any well-known stable shape, it is preferred that top forming surface 24 be circular. Bottom surface 22 can include base feet 26 to facilitate stability and prevent lateral movement of base 12.

Hinge 16 pivotally connects lid 14 to base 12 to allow pivotal movement of lid 14 about an axis 28 and to allow transverse movement of lid 14 relative to axis 28. In this respect, hinge 16 includes base hinge leaves 30 and 32 which respectively have hinge slots 34, 36. Lid 14 includes lid hinge leaf 38 which has opposing hinge pins 40 and 42 coaxial with axis 28. Further, hinge pins 40 and 42 are received in hinge slots 34, 36 to allow pivotal movement of lid 14 with respect to base 12. Transverse movement of lid 14 relative to axis 28 is provided by the elongated shape of hinge slots 34, 36. More particularly, hinge slots 34, 36 are generally oval in shape wherein the slot height "sh" is greater than the slot width "sw" such that the slot width sw is slightly greater than the diameter of the corresponding hinge pin 40, 42 and height sh is greater than the diameter of hinge pins 40 and 42 to allow the transverse movement of lid 14 relative to axis 28. Base hinge leaves 30, 32 further include vertical holes 44, 46 which contain hinge springs 48, 50 respectively that engage hinge pins 40, 42. In this respect, hinge springs 48, 50 maintain hinge pins 40, 42 at their lowermost positions within hinge slots 34, 36 that is dependent on the position of lid 14 and the height "H" of the sizing ring 18 which will be discussed in more detail below. It should be noted that other hinge designs that provide both pivotal and transverse movement could be utilized.

Lid 14 includes a top portion 52 and a bottom forming surface 54. While lid 14 can have a variety of peripheral shapes, it is preferred that at least bottom forming surface 54 of lid 14 is circular and corresponds with the shape and size of top forming surface 24 of base 12. As with base 12, lid 14 can be made from a variety of materials such as, but not limited to, steel, plastic or wood. Bottom forming surface 54, however, should be made from a material designed for food preparation use such as stainless steel or hard wood. Further, bottom forming surface 54 can also be made from a non-stick surface such as TEFLON®. Lid 14 further includes handle 56 which has gripping portion 58 and connecting arms 60, 62.

Sizing ring 18 controls the forming of dough ball 64 into tortilla shell 20. In this respect, height H of sizing ring 18 corresponds with the thickness "t" of tortilla shell 20. Inner diameter "ID" of sizing ring 18 corresponds with the diameter d of tortilla shell 20. Sizing ring 18 includes a top edge 66 substantially equal to and opposite of a bottom edge 68 which are parallel to one another and spaced by height H of sizing ring 18. Further, sizing ring 18 includes an inner cylindrical surface 70 perpendicular to top and bottom edges 66, 68 and corresponding to height H and inner diameter ID. As an option which will be discussed in greater detail below, sizing ring 18 can further include ring tab 72 having a bottom surface 74 to assist in the removal of the formed tortilla shell 20 from sizing ring 18.

In this embodiment, the forming surfaces 24 and 54 are planar surfaces. Tortilla shell 20 is formed by first placing the bottom edge 68 of the open ended sizing ring 18 on top forming surface 24 such that bottom edge 68 is coplanar with top forming surface edge 24. Dough ball 64 is then placed on top forming surface 24 within the inner cylindrical surface 70 of sizing ring 18. Subsequently, lid 14 is pivoted about axis 28 so that bottom forming surface 54 moves toward top forming surface 24 and engages dough ball 64 thereby forming dough ball 64 within sizing ring 10. Further, while the inner cylindrical surface 70 controls the shape of the peripheral edge of tortilla shell 20, the pivotal movement of lid 14 is restricted by sizing ring 18 to maintain the proper thickness t of tortilla shell 20. In this respect, lid 14 first pivots about axis 23 toward base 12 until bottom forming surface 54 engages top edge 66 of sizing ring 18. The hinge 16 allows both pivotal and transverse motion of lid 14 about axis 28 to complete the forming process within sizing ring 18.

Pivotal and transverse motion of lid 14 is necessary to form dough ball 64 within sizing ring 18. In this respect, hinge 16 allows lid 14 to rotate about axis 28 by the rotation of hinge pins 40, 42 in hinge slots 34, 36 respectively until bottom forming surface 54 engages the leading edge 76 of sizing ring 18. However, in this position, bottom forming surface 54 is not coplanar with top edge 66 whereby the forming process is not complete. Further rotation of lid 14 about axis 28 requires transverse movement of lid 14 relative to axis 28. The amount of transverse movement depends on the height H, diameter and position of sizing ring 18 and is provided by slots 34, 36. More particularly, hinge pins 40, 42 are allowed to move vertically within hinge slots 34, 36 respectively, such that bottom forming surface 54 of lid 14 is able to fully contact top surface 66 of sizing ring 18 eliminating gaps therebetween regardless of the height H of sizing ring 18.

The coplanar contact between forming surfaces 24 and 54 and ring edges 66, 68 produce mold cavity 78, wherein mold cavity 78 is defined by top forming surface 24, bottom forming surface 54 and inner cylindrical surface 70. Accordingly, as lid 14 is moved in the above-described manner, dough ball 64 is formed into tortilla shell 20 by the restrictive forming effects of surfaces 24, 54 and 70 within sizing ring 18. Sufficient contact force between top and bottom forming surfaces 24 and 54 and ring edges 66, 68 of sizing ring 18 to maintain dough ball 64 within mold cavity 78 is produced by the downward force applied to handle 56 in conjunction with the transverse motion of hinge 16 and hinge springs 48, 50. More particularly, the hinge springs produce sufficient pressure on the leading edge 70 of sizing ring 18, while the handle force produces sufficient pressure on trailing edge 77 of sizing ring 18 to account for the transverse motion lid 14 about axis 28. It should be noted that other hinge designs which allow motion transverse to the pivot 28 can be used to account for differing sizes and placements of sizing ring 18.

The tortilla forming machine 10 allows tortilla shells of many different thicknesses t and diameters d to be made based only on the size of the sizing ring 18. In this respect, many differently sized and shaped sizing rings 18 can be provided so that the user of the tortilla forming machine 10 can easily make a plurality of sizes of tortilla shells 20. In order to change the size of tortilla shell 20, sizing ring 18 merely needs to be removed from top forming surface 24 and replaced with a different size or shape sizing ring. No other adjustments are required.

The removal of sizing ring 18 from top forming surface 24 for either removing tortilla shells or changing the sizing ring can be made easier by ring tab 72. In this respect, ring tab 72 produces an additional grasping point away from tortilla shell 20 and also can include a curved portion producing a grasping point above top forming surface 24. More particularly, ring tab 72 can be curved such that bottom surface 74 of ring tab 72 tapers away from bottom surface 68 of sizing ring 18 in its relaxed state. As a result, ring tab 72 extends away from bottom surface 24 to allow easier grasping of sizing ring 18. However, as lid 14 is moved toward base 12, the bottom forming surface 54 of lid 14 engages ring tab 72 which in turn flexes ring tab 72 downwardly so that bottom surface 54 can fully engage top ring edge 66 to form mold cavity 78.

Referring to FIGS. 4–7, another embodiment of the present invention is shown, wherein tortilla forming machine 80 includes a base 81 having a circular recessed portion 82. Sizing ring 84 fits within recessed portion 82 and defines both a bottom portion 86 and side portion 88 of mold cavity 90. However, it should be noted that sizing ring 84 could also be used in connection with planar top forming surface 24 shown in FIGS. 1 and 2. With respect to base 81 shown in FIGS. 4 through 7, the top of mold cavity 90 is formed by bottom forming surface 54 of lid 14. The desired size of tortilla shell 20 is produced by utilizing the sizing ring 84 which corresponds therewith.

Sizing ring 84 includes a ring portion 92 having a height "H2" and an inner diameter "ID2." Sizing ring 84 further includes spacer 94 so that top surface 96 of ring portion 92 is coplanar with or slightly raised above top surface 97 of base 81.

Figure 6:
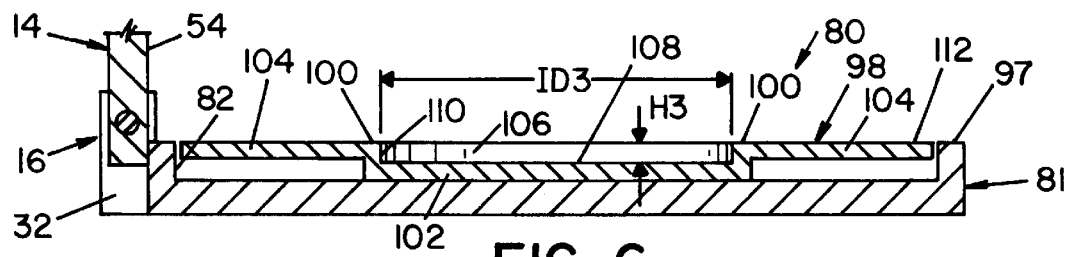
FIG. 6 is a sectional elevation view of the tortilla machine shown in FIG. 4 showing another embodiment of the sizing ring.

Referring to FIG. 6, another embodiment of the present invention is shown, wherein a sizing ring 98 is shown which includes ring portion 100, base portion 102 and peripheral flange 104. Mold cavity 106 is defined by the top surface 108 of base portion 102 and inner peripheral surface 110 of ring portion 100 along with bottom forming surface 54 of lid 14. Upper flange surface 112 is coplanar with or slightly raised above top surface 114 of base 81. Sizing ring 98 includes a height "H3" and an inner diameter "ID3."

Figure 7:
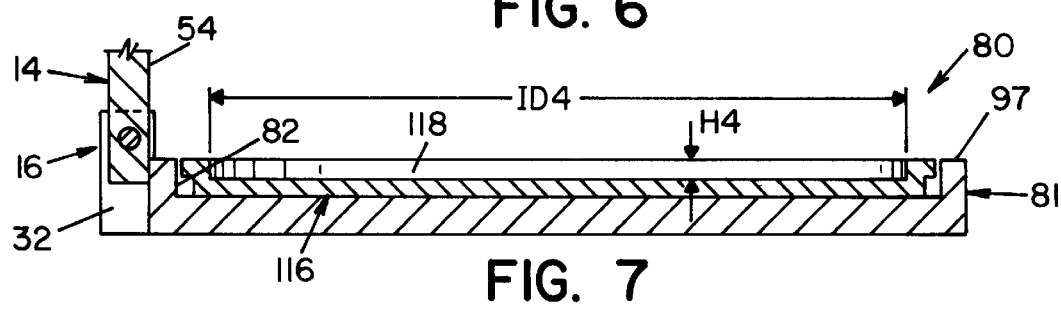
FIG. 7 is a sectional elevation view of the tortilla forming machine shown in FIG. 6 with a different sizing ring.
Figure 5:
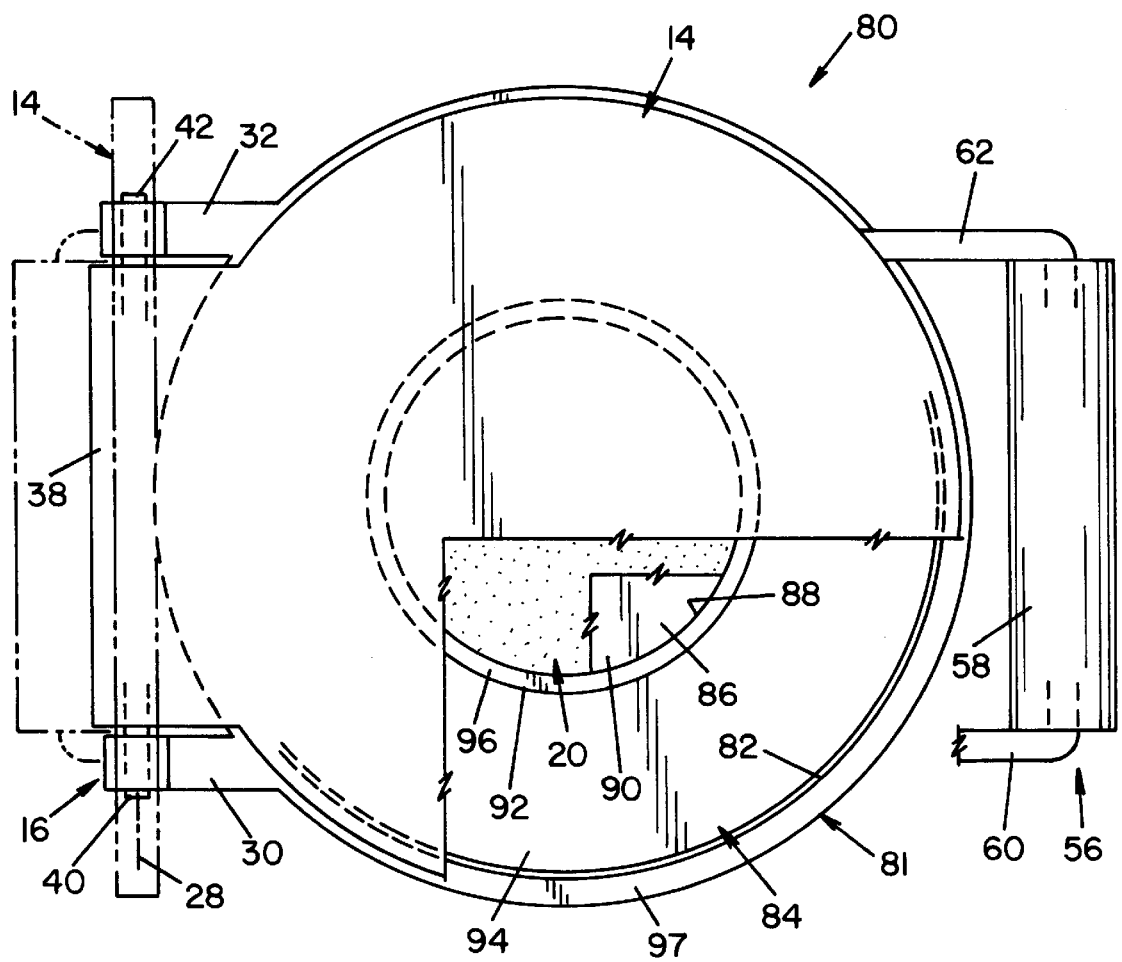
FIG. 5 is a partial section top plan view of the tortilla forming machine shown in FIG. 4.

FIG. 7 shows a sizing ring 116 which is of the same design as sizing ring 98 except for mold cavity 118 being of a different size than mold cavity 106 of sizing ring 98. In this respect, sizing ring 116 has a height "H4" and an inner diameter "ID4" which are different from H3 and ID3 respectively.

While considerable emphasis has been placed on the preferred embodiments of the invention illustrated and described herein, it will be appreciated that other embodiments can be made and that many changes can be made in the preferred embodiments without departing from the principals of the invention. Accordingly, it is to be distinctly understood that the foregoing descriptive matter is to be interpreted merely as illustrative of the invention and not as a limitation.

Having thus described the invention, it is claimed:

1. A tortilla forming machine for molding dough into a tortilla shell having a top, a bottom, a peripheral edge, and a thickness, said forming machine comprising a first member having a first forming surface; a second member having a second forming surface moveable toward and away from said first forming surface; and at least one removable sizing ring separate from said first forming surface and said second forming surface, said sizing ring having a first edge and an opposing second edge, an inwardly facing surface between said first edge and said second edge with a height, said sizing ring defining a cavity between said first and second forming surfaces when said first forming surfaces is adjacent said first edge and said second forming surface is adjacent said second edge; said inwardly facing surface of said sizing ring defining said peripheral edge of the tortilla shell and said height of said inwardly facing surface defining the thickness of the tortilla shell.

2. The tortilla forming machine of claim 1, further including a hinge having a first hinge leaf interengaged with said first member and a second hinge leaf interengaged with said second member, said second hinge leaf being pivotally mounted about an axis to said first hinge leaf to allow said movement of said second forming surface relative to said first forming surface.

3. The tortilla forming machine of claim 2, wherein said hinge further includes a member associated with one of said first and second hinge leafs allowing movement of said first and second leafs transverse to said axis.

4. The tortilla forming machine of claim 3, wherein said first and second surfaces are planar and said sizing ring is an open ended ring.

5. The tortilla forming machine of claim 4, wherein said first and second forming surfaces are non-stick surfaces.

6. The tortilla forming machine of claim 5, wherein said at least one removable sizing ring is a plurality of differently configured sizing rings.

7. The tortilla forming machine of claim 6, further comprising a return spring between said first member and said second member for said movement of said second forming surface away from said first forming surface.

8. The tortilla forming machine of claim 1, wherein said first and second surfaces are planar.

9. The tortilla forming machine of claim 8, further including a hinge with a first hinge leaf interengaged with said first member and a second hinge leaf interengaged with said second member, said second hinge leaf being pivotally mounted about an axis to said first hinge leaf to allow said movement of said second forming surface relative to said first forming surface.

10. The tortilla forming machine of claim 9, further comprising a return spring between said first member and said second member for said movement of said second forming surface away from said forming surface.

11. The tortilla forming machine of claim 1, wherein said at least one removable sizing ring is a plurality of differently configured sizing rings.

12. The tortilla forming machine of claim 11, further including a permanent sizing ring operably connected to one of said first and second forming surfaces and having an inwardly facing surface having inner diameter, said at least one removable sizing rings each further including an outwardly facing surface opposite said inwardly facing surface having an outer diameter, wherein said inner diameter of said permanent ring is greater than said each outer diameter of said at least one sizing ring.

13. The tortilla forming machine of claim 1, wherein one of said first and second forming surfaces include a recess having a peripheral edge and a depth and said at least one removable sizing ring has an outwardly facing surface opposite said inwardly facing surface, said sizing ring fitting within said recess such that said outwardly facing surface is spaced from said peripheral edge of said recess.

14. The tortilla forming machine of claim 13, wherein said at least one removable sizing ring further includes a flange on one of said first and second edges, said flange having an outer peripheral edge spaced from said peripheral edge of said recess.

15. The tortilla forming machine of claim 14, wherein said at least one removable sizing ring is a plurality of differently configured sizing rings.

16. The tortilla forming machine of claim 1, further including a permanent sizing ring operably connected to one of said first and second forming surfaces and having an inwardly facing surface having inner diameter, said at least one removable sizing rings each further including an outwardly facing surface opposite said inwardly facing surface having an outer diameter, wherein said inner diameter of said permanent ring is greater than said each outer diameter of said at least one sizing.

17. A tortilla forming machine for molding dough into a tortilla shell having a top, a bottom, a peripheral edge, and a thickness, said forming machine comprising a first member having a first forming surface; a second member having a second forming surface moveable toward and away from said first forming surface; and at least one removable sizing ring separate from said first forming surface and said second forming surface, said sizing ring having a first edge and an opposing second edge and a recess in one of said first edge or said second edge, said recess including a bottom surface contiguous with an inwardly facing surface between said first edge and said second edge, said inwardly facing surface having a height, said recess defining a cavity between said first and second forming surfaces when said first forming surfaces is adjacent said first edge and said second forming surface is adjacent said second edge; said inwardly facing surface of said recess defining said peripheral edge of the tortilla shell and said height of said inwardly facing surface defining the thickness of the tortilla shell.

18. The tortilla forming machine of claim 17, wherein said first and second surfaces are planar.

19. The tortilla forming machine of claim 17, further including a hinge with a first hinge leaf interengaged with said first member and a second hinge leaf interengaged with said second member, said second hinge leaf being pivotally mounted about an axis to said first hinge leaf to allow said movement of said second forming surface relative to said first forming surface.

20. The tortilla forming machine of claim 19, wherein said hinge further includes a member associated with one of said first and second hinge leafs allowing movement of said first and second leafs transverse to said axis.

21. The tortilla forming machine of claim 20, wherein said first and second forming surfaces are non-stick surfaces.

22. The tortilla forming machine of claim 21, further comprising a return spring between said first member and said second member for said movement of said second forming surface away from said forming surface.

* * * * *